United States Patent
McCallum et al.

(10) Patent No.: US 9,058,080 B2
(45) Date of Patent: *Jun. 16, 2015

(54) USER INPUT DEVICE FAILURE PREDICTION

(71) Applicant: International Business Machines Corporation, Armonk, NY (US)

(72) Inventors: Jeffrey R. McCallum, Tucson, AZ (US); Tiberiu M. Hajas, Pleasanton, CA (US); Esperanza Darlene Rodriguez, Tucson, AZ (US); Harsha D. Gunatilaka, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,305

(22) Filed: Aug. 8, 2014

(65) Prior Publication Data

US 2014/0347305 A1 Nov. 27, 2014

Related U.S. Application Data

(63) Continuation of application No. 14/045,580, filed on Oct. 3, 2013, now Pat. No. 8,874,977, and a continuation of application No. 13/101,506, filed on May 5, 2011, now Pat. No. 8,612,808.

(51) Int. Cl.
*G06F 11/00* (2006.01)
*G06F 3/041* (2006.01)
*G06F 3/0488* (2013.01)

(52) U.S. Cl.
CPC ............ *G06F 3/0418* (2013.01); *G06F 11/008* (2013.01); *G06F 3/0488* (2013.01)

(58) Field of Classification Search
None
See application file for complete search history.

(56) References Cited

U.S. PATENT DOCUMENTS

| | | |
|---|---|---|
| 4,831,359 A | 5/1989 | Newell |
| 5,241,139 A | 8/1993 | Gungl et al. |
| 7,372,456 B2 | 5/2008 | McLintock |
| 2005/0195172 A1 | 9/2005 | Lu |
| 2006/0007177 A1 | 1/2006 | McLintock |
| 2006/0125799 A1 | 6/2006 | Hillis et al. |
| 2007/0091077 A1 | 4/2007 | Lii et al. |
| 2008/0111788 A1 | 5/2008 | Rosenberg et al. |
| 2008/0174565 A1 | 7/2008 | Chang et al. |
| 2008/0174570 A1 | 7/2008 | Jobs et al. |
| 2008/0278453 A1 | 11/2008 | Reynolds et al. |
| 2009/0184933 A1 | 7/2009 | Wei-Wen et al. |
| 2010/0229112 A1 | 9/2010 | Ergan et al. |
| 2011/0126095 A1 | 5/2011 | Brock et al. |
| 2011/0128254 A1 | 6/2011 | Teranishi et al. |
| 2011/0239060 A1 | 9/2011 | Okada |
| 2012/0274591 A1 | 11/2012 | Rimas-Ribikauskas et al. |
| 2013/0031422 A1 | 1/2013 | Church et al. |
| 2013/0050118 A1 | 2/2013 | Kjelsbak et al. |

*Primary Examiner* — Yolanda L Wilson
(74) *Attorney, Agent, or Firm* — Suiter Swantz pc llo (57) ABSTRACT

Detection of degradation of a user input device may allow for notifying a user of an impending failure of the user input device so that the device may be taken out of service or repaired. A method for detecting degradation of a user input device may carry out one or more operations including, but not necessarily limited to: determining that a portion of the user input device is degraded based on two or more received signals of the user input device, the two or more received signals being indicative of one or more user inputs; and providing a user notification indicative of a degradation of the user input device in response to determining that a portion of the user input device is degraded based on two or more received signals of the user input device.

20 Claims, 10 Drawing Sheets

USER INPUT DEVICE FAILURE PREDICTION

CROSS-REFERENCE TO RELATED APPLICATIONS

The present application is a continuation of U.S. patent application Ser. No. 14/045,580 filed Oct. 3, 2013, entitled "TOUCH-SENSITIVE USER INPUT DEVICE", which is a continuation of U.S. patent application Ser. No. 13/101,506 filed May 5, 2011, entitled "TOUCH-SENSITIVE USER INPUT DEVICE"; the present continuation application claims the benefit under 35 U.S.C. §120 of U.S. patent application Ser. No. 14/045,580, which claims the benefit under 35 U.S.C. §120 of U.S. patent application Ser. No. 13/101,506. U.S. patent application Ser. Nos. 14/045,580 and 13/101,506 are herein incorporated by reference in their entirety.

BACKGROUND

Gesturing is a quickly emerging user interface (UI) input mechanism. Such inputs may be applicable to various devices that include touch screen-based UIs employed by touch-sensitive devices (e.g. hand-held/mobile devices such as touch-screen enabled smart phones and tablet computers, large mounted displays, and the like).

SUMMARY

Accordingly, an embodiment includes a method for detecting degradation of a user input device. The method may include determining that a portion of the user input device is degraded based on two or more received signals of the user input device, the two or more received signals being indicative of one or more user inputs. The method may further include providing a user notification indicative of a degradation of the user input device in response to determining that a portion of the user input device is degraded based on two or more received signals of the user input device.

DETAILED DESCRIPTION

The present invention is directed to systems and methods for detecting degradation of touch-sensitive user input devices and providing corresponding user notifications indicative of those degradations. Over time, the functionality of a touch-sensitive user input device may suffer due to degradation of the hardware components (e.g. capacitive elements) employed within the touch-sensitive user input device. In uptime-critical applications where failure of a touch-sensitive user input device may result in costly or dangerous conditions (e.g. in military or emergency response environments), it may be desirable to provide a user with a prior notification of an impending failure of the touch-sensitive user input device so that the device may be taken out of service or repaired.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
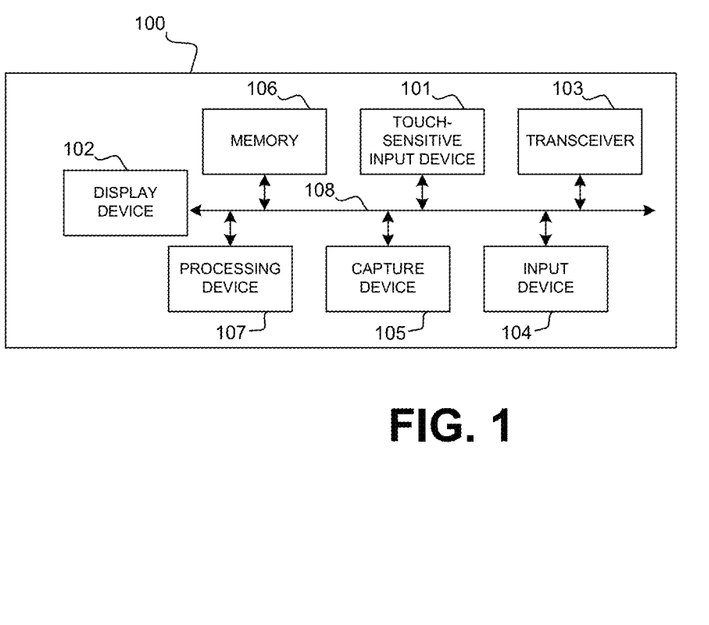
FIG. 1 illustrates a system for detecting degradation of a touch-based user input device.

FIG. 1 depicts a computing device 100 including at least one touch-sensitive input device 101. For example, the computing device 100 may be a touch-screen enabled tablet computer or smart phone, a touch-pad enabled laptop or desktop computing device, and the like. In various embodiments, the touch-sensitive input device 101 may include a track pad-type device, a touch screen-type device, or any other touch-based input device.

In the case of a touch screen-type device, the touch-sensitive input device 101 may include a display device 102.

The computing device 100 may further include a transceiver 103, one or more input devices 104, one or more capture devices 105, a memory 106, a processing device 107 and/or the display device 102. The touch-sensitive input device 101, display device 102, transceiver 103, input devices 104, capture devices 105, memory 106 and/or the processing device 107 may be operably coupled to one another via a bus 108 (e.g., a wired and/or wireless bus).

The display device 102 may be configured to display data retrieved from memory 106, received from input devices 104, one or more capture devices 105, etc.

The transceiver 103 may be any system and/or device capable of communicating (e.g., transmitting and receiving data and/or signals) with a network. The transceiver 103 may be operatively connected to a network via a wireless (e.g. Wi-Fi, Bluetooth, cellular data connections, etc.) or wired (Ethernet, etc.) connection.

The one or more input devices 104 may be any system and/or device capable of receiving input from a user. Examples of input devices 104 include, but are not limited to, a mouse, a key board, a microphone, a selection button, and the like input devices. In various embodiments, an input device 104 may be in communication with a touch-sensitive input device 101. In other embodiments, touch-sensitive input device 101 is itself, an input device 104.

The capture devices 105 may be any system and/or device capable of capturing environmental inputs (e.g., visual inputs, audio inputs, tactile inputs, etc.). Examples of capture devices 105 include, but are not limited to, a camera, a microphone, a global positioning system (GPS), a gyroscope, a plurality of accelerometers, and the like.

The memory 106 may be any system and/or device capable of storing data (e.g. RAM, flash, hard drive, and the like). In one embodiment, memory 106 stores computer code (e.g. software, firmware, and the like). The processing device 107 may be configured (e.g. executing computer code instructions stored within the memory 106; employing application specific circuitry) to perform methods for detecting degradation of the touch-sensitive input device 101.

Figure 2:
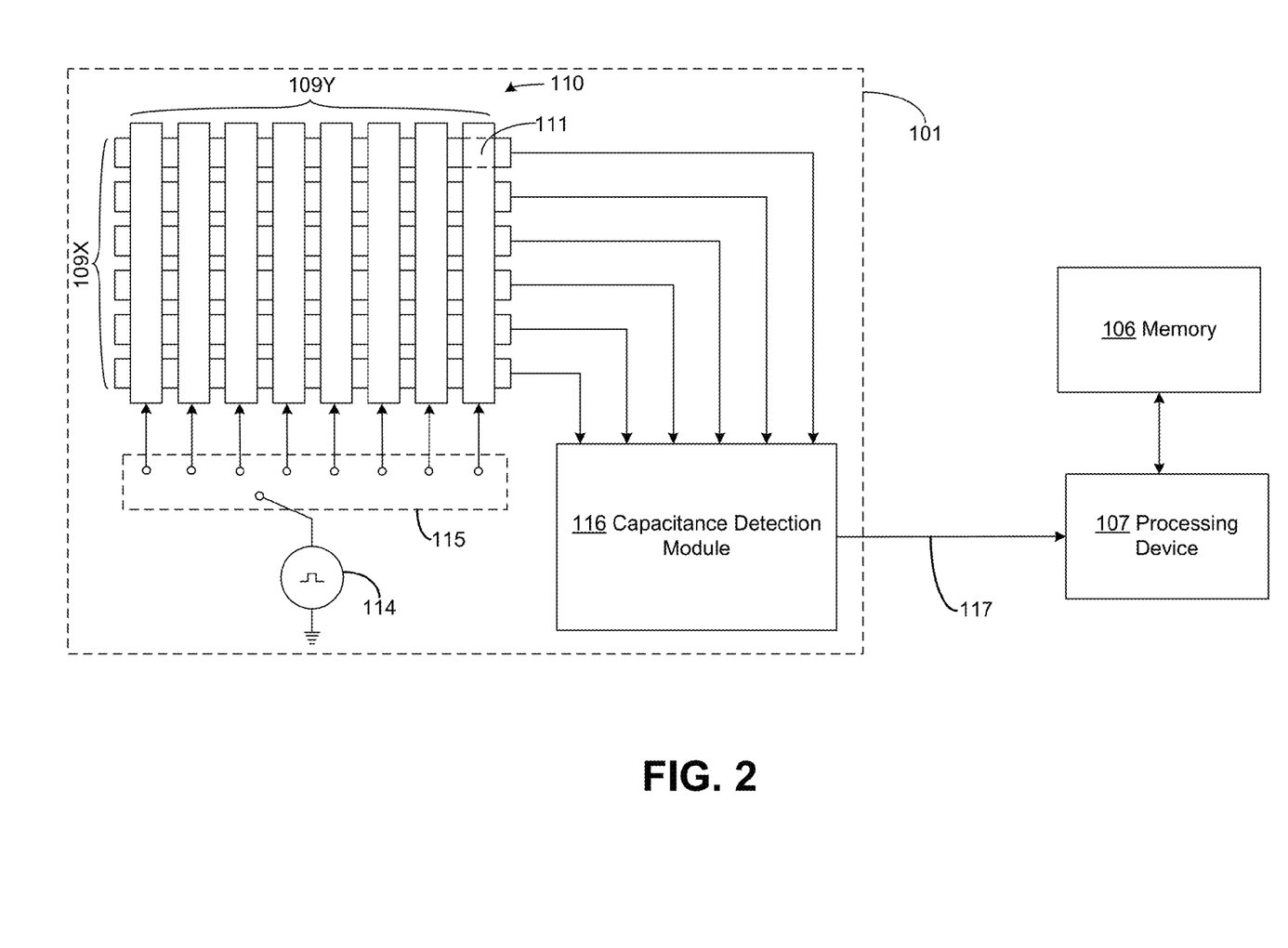
FIG. 2 illustrates a system for detecting a touch-based user input.

As shown in FIG. 2, the touch-sensitive input device 101 may include various rows and columns of electrodes 109. The rows and columns of electrodes 109, together with a defined coordinate axis, may form an electrode array 110 having electrodes 109X and electrodes 109Y in the X and Y directions, respectively. A particular region of the electrode array 110 may define a capacitive sensor 111 at an intersection point of an electrode 109X and an electrode 109Y.

Figure 3:
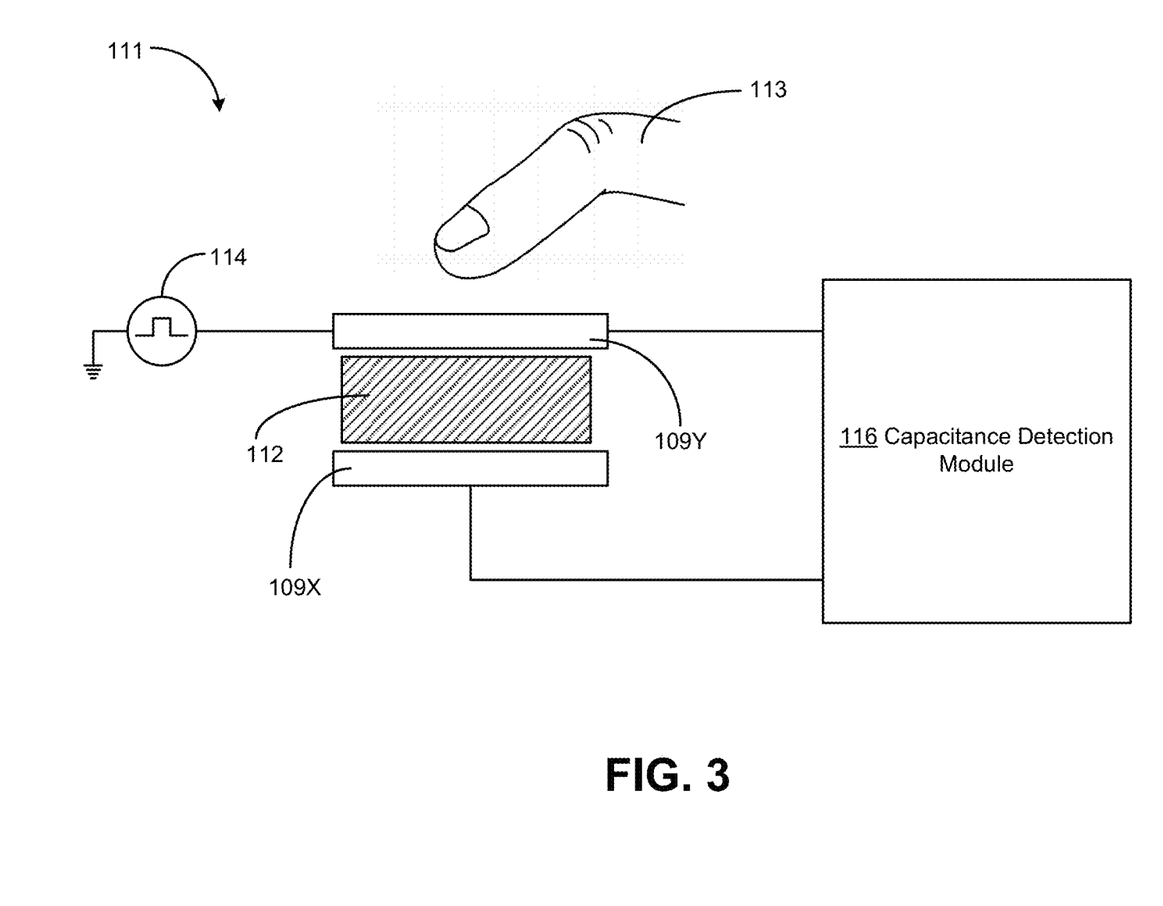
FIG. 3 illustrates a system for detecting a touch-based user input.

FIG. 3 illustrates a capacitive sensor 111. The electrode 109X and the electrode 109Y may be separated by a dielectric material 112. During operation of the touch-sensitive input device 101, a user 113 may apply a touch substantially proximate to the capacitive sensor 111. The user touch may serve to alter the local electrostatic field about the capacitive sensor 111 thereby reducing the mutual capacitance within the capacitive sensor 111. For example, when a user's finger is capacitively coupled to the sense electrode 109Y, the impedance of the capacitive sensor 111 (as seen by a voltage source) decreases and thus, the charge available to charge the capacitive sensor 111 increases. This, in turn, translates to a greater charging current when a user's finger touches (or is proximate to) the touch-sensitive input device 101 as compared to when a user's finger is not present.

Referring again to FIG. 2, the touch-sensitive input device 101 may further include circuitry for generation of a reference signal 114. The reference signal 114 may be selectively applied to electrodes 109Y by a switch 115 to induce a charge buildup in those electrodes 109Y. Variations in mutual capacitance resulting from a user touch existing between various electrodes 109X for a selected electrode 109Y may be compared by a capacitance detection module 116. The capacitance detection module 116 may monitor the capacitance change at every individual point on the grid (e.g. at each capacitive sensor 111 defined by an intersection of an electrode 109X and an electrode 109Y) by cycling through all X-Y pairs of electrodes 109 to identify the pair associated with the greatest reduction in capacitance which may be indicative of a location of a user touch.

Upon detection of user touch, a signal 117 characteristic of the location on the touch-sensitive input device 101 associated with that touch as identified by the capacitance detection module 116 may be provided to other systems (e.g. circuitry, processors implementing software and or firmware, etc.) for use in various additional applications (e.g. user interface navigation, user input reception, etc.). For example, the signal 117 may be provided to the processing device 107.

As mentioned above, touch-sensitive input device 101 may have a finite lifespan at which point the touch-sensitive input device 101 may not operate properly due to degradation of the components of the touch-sensitive input device 101. Such operational defects within the touch-sensitive input device 101 may be propagated into various systems which rely on the touch-sensitive input device 101 for input (e.g. applications receiving touch-based inputs).

Figure 4:
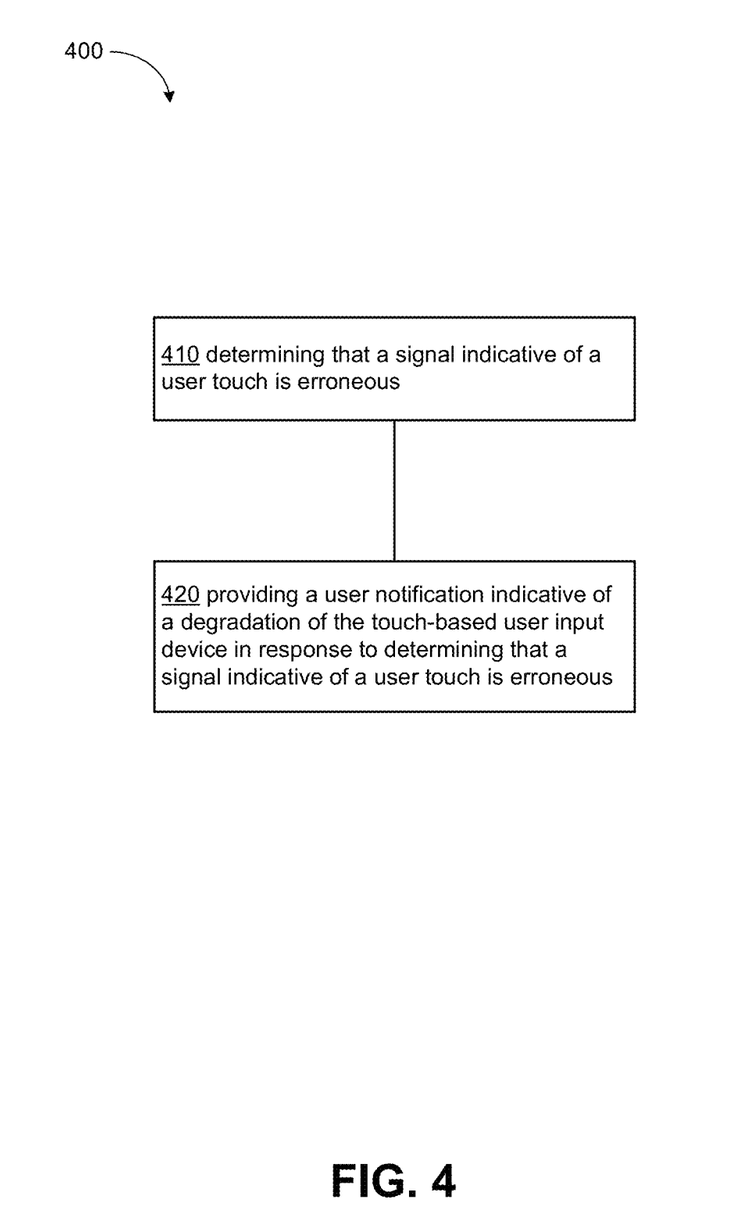
FIG. 4 illustrates a method for detecting degradation of a touch-based user input device.

FIG. 4 illustrates an operational flow 400 representing example operations related to detecting degradation of the touch-sensitive input device 101. Specifically, operational flow 400 presents operations which may be employed to detect "jump"-type error conditions where the touch-sensitive input device 101 generates signals indicating a rapid jump between input locations on the touch-sensitive input device 101 or "sticky-key"-type error conditions where the touch-sensitive input device 101 generates signals indicating rapid repetitions of a user input at a substantially common location. In reference to FIG. 4, discussion and explanation may be provided with respect to the above-described examples of FIGS. 1-3 and 5-6, and/or with respect to other examples and contexts. However, it should be understood that the operational flows may be executed in a number of other environments and contexts, and/or in modified versions of FIGS. 1-3 and 5-6. In addition, although the various operational flows are presented in the sequence(s) illustrated, it should be understood that the various operations may be performed in other orders than those that are illustrated, or may be performed concurrently.

Figure 5:
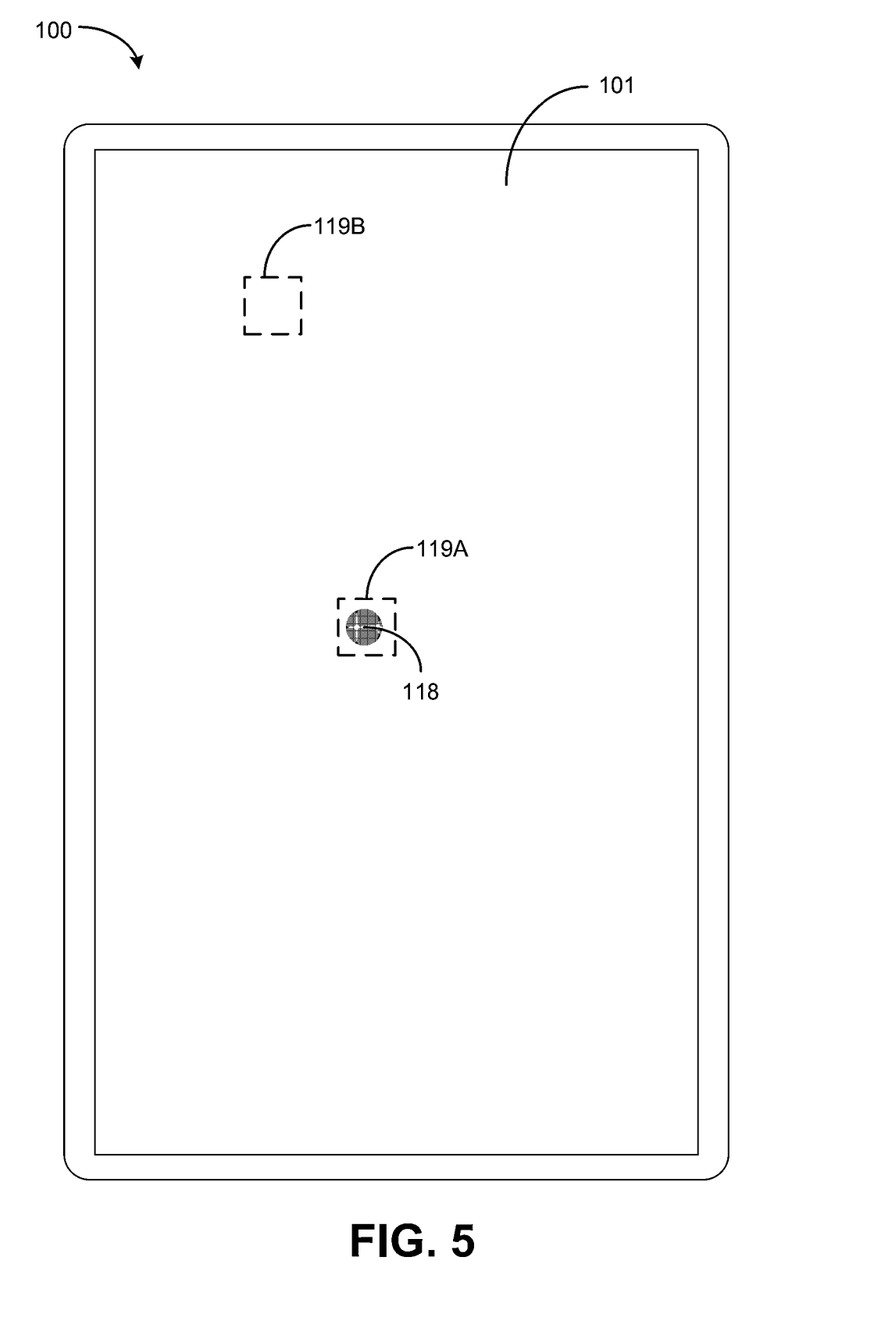
FIG. 5 illustrates a touch-based user input device.

Operation 410 illustrates determining that a signal indicative of a user touch is erroneous. For example, as shown in FIG. 5, the touch-sensitive input device 101 (e.g. a touch screen) of the computing device 100 may receive a touch-based user input 118. As described above, the touch-sensitive input device 101 may generate a signal 117 indicative of a touch-based user input 118 associated with a region 119A of the touch-sensitive input device 101 and provide that signal 117 to the processing device 107 where it may be detected by the processing device 107. It may be the case that one or more capacitive sensors 111 within the touch-sensitive input device 101 become degraded over time. Specifically, it may be the case that certain capacitive sensors 111 provide signals erroneously indicating a user touch when, in fact, no such contact has occurred. In such a case, one or more degraded capacitive sensors 111 may generate an erroneous signal associated with a second region 119B of the touch-sensitive input device 101 and provide that signal to the processing device 107 where it may be detected by the processing device 107. Upon receipt of the signal associated with the first region 119A and the second region 119B, the processing device 107 may carry out one or more computations to determine whether the signal associated with the second region 119B is merely a subsequent touch-based user input 118 or is, instead, an erroneous indication of a touch-based user input 118 caused by a degraded capacitive sensor 111. To make this determination, the processing device 107 may compare the relative positions of region 119A and region 119B and the times at which the signals 117 associated with each of region 119A and region 119B were received. If the region 119A and region 119B are greater than a threshold distance apart (e.g. 15 cm) and the signals 117 are detected within a threshold time period (e.g. 10 ms), it may be determined that the signal 117 associated with region 119B, is in fact an erroneous indication of a user touch.

Figure 6:
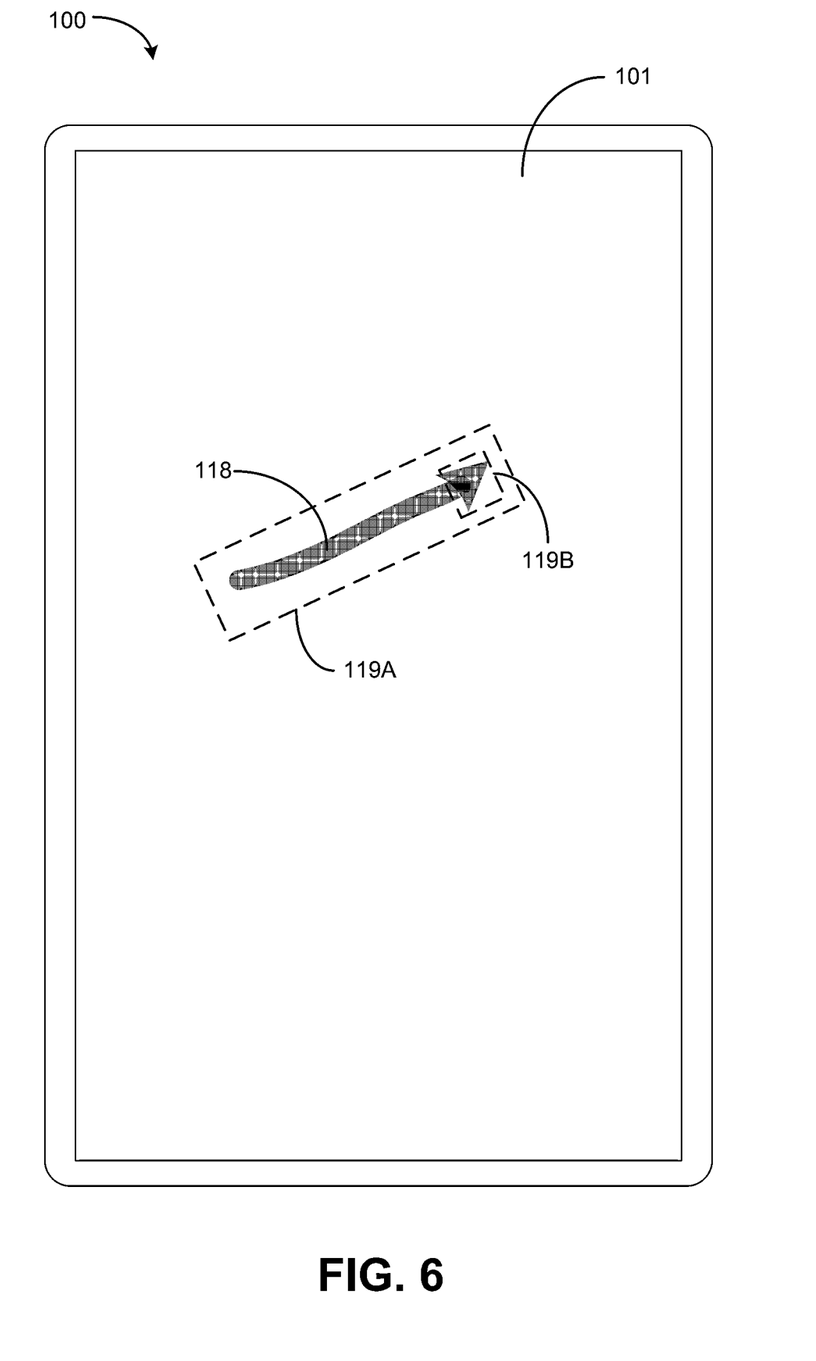
FIG. 6 illustrates a touch-based user input device.

In another example of operation 410, as shown in FIG. 6, the touch-sensitive input device 101 (e.g. a touch screen) of the computing device 100 may receive a touch-based user input 118 (e.g. a dynamic touch moving across the surface of the touch-sensitive input device 101). As described above, the touch-sensitive input device 101 may generate a signal 117 indicative of a touch-based user input 118 and provide that signal 117 to the processing device 107 where it may be detected by the processing device 107. Following the touch-based user input 118, it may be the case where one or more degraded capacitive sensors 111 may continue to generate erroneous signals associated with a region 119B of the touch-sensitive input device 101 at least partially associated (e.g. at least partially overlapping) with the region 119A of the touch-sensitive input device 101 defined by touch-based user input 118. The touch-sensitive input device 101 may provide those signals to the processing device 107 where they may be detected by the processing device 107. Upon receipt of the signal associated with the region 119A and the region 119B, the processing device 107 may carry out one or more computations to determine whether the signal associated with the region 119B is merely a subsequent touch-based user input 118 or is, instead, an erroneous indication of a touch-based user input 118 caused by a degraded capacitive sensor 111. To make this determination, the processing device 107 may compare the relative positions of region 119A and region 119B and the times at which the signals 117 associated with each of region 119A and region 119B were received. If region 119A and region 119B are at least partially overlapping (e.g. as shown in FIG. 6) and the signals 117 indicative of user inputs associated with region 119A and region 119B are detected within a threshold time period (e.g. 10 ms), it may be determined that the signal 117 associated with region 119B, is in fact an erroneous indication of a user touch. Further, the processing device 107 may determine a number of times that a signal 117 associated with region 119B is detected following the detection of a signal 117 associated with region 119A and compare that number to a threshold number. Should the number of times that a signal 117 associated with region 119B is detected following the detection of a signal 117 associated with region 119A exceed the threshold number, it may be determined that the signal 117 associated with region 119B, is in fact an erroneous indication of a user touch and that the touch-sensitive inpute device 101 may be degraded.

Referring again to FIG. 4, operation 420 illustrates providing a user notification indicative of a degradation of the touch-based user input device in response to determining that a signal indicative of a user touch is erroneous. Following the determination of a degradation of the touch-sensitive input device 101 (e.g. as in operation 410), the processing device 107 may provide a notification (e.g. a user notification) indicating such a degradation. For example, the processing device 107 may provide one or more signals to the display device 102 of the computing device 100 causing the display device 102 to display a visual notification (e.g. a pop-up window including a text-based or graphical message, illumination of an indicator LED, etc.) indicating that a degradation of the touch-sensitive input device 101 has been detected. In another example, the processing device 107 may provide one or more signals causing an audio speaker of the computing device 100 to emit an audible notification (e.g. a spoken warning message) indicating that a degradation of the touch-sensitive input device 101 has been detected. In still another example, the processing device 107 may provide one or more signals to the transceiver 103 of the computing device 100 causing the transceiver 103 to transmit an electronic message (e.g. an e-mail, text message, instant message, and the like) to a network (e.g. cellular, satellite, LAN, WLAN and the like) operably coupled to the touch-sensitive input device 101 indicating that a degradation of the touch-sensitive input device 101 has been detected.

Figure 7:
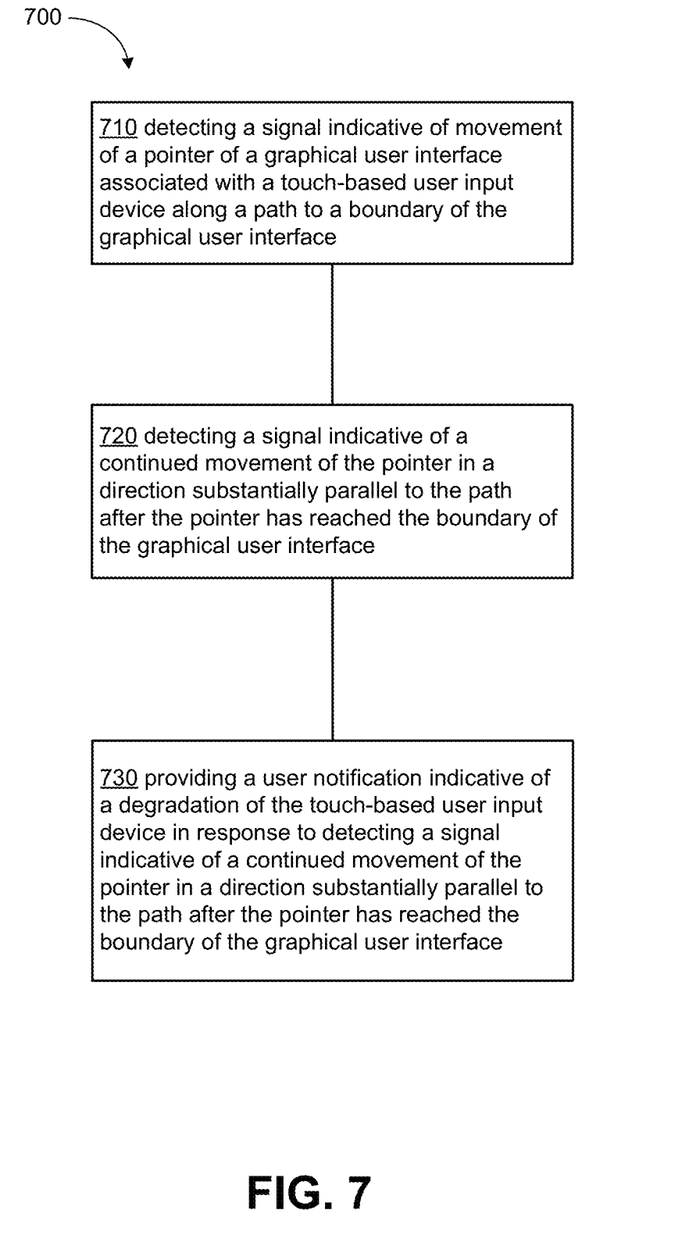
FIG. 7 illustrates a method for detecting degradation of a touch-based user input device.

FIG. 7 illustrates an operational flow 700 representing example operations related to detecting degradation of the touch-sensitive input device 101. Specifically, operational flow 700 presents operations which may be employed to detect a "constant motion"-type error condition where the touch-sensitive input device 101 generates signals indicating that a pointer of a graphical user interface is to continue moving even after the pointer has reached a boundary of the graphical user interface. In reference to FIG. 7, discussion and explanation may be provided with respect to the above-described examples of FIGS. 1-3 and 8, and/or with respect to other examples and contexts. However, it should be understood that the operational flows may be executed in a number of other environments and contexts, and/or in modified versions of FIGS. 1-3 and 8. In addition, although the various operational flows are presented in the sequence(s) illustrated, it should be understood that the various operations may be performed in other orders than those that are illustrated, or may be performed concurrently.

Operation 710 illustrates detecting a signal indicative of movement of a pointer of a graphical user interface associated with a touch-based user input device along a path to a boundary of the graphical user interface. For example, as described above and as shown in FIG. 8, the touch-sensitive input device 101 may generate one or more signals 117 indicative of a touch-based user input 118 of the touch-sensitive input device 101 and may provide those signals 117 to the processing device 107 where they may be detected by the processing device 107. The processing device 107 executes instructions maintained in memory 106 to run a driver application whereby the processing device 107 generates signals instructing the display device 102 to present a graphical user interface 120 including a pointer 121 guided by touch-based user inputs 118 received via the touch-sensitive input device 101. It may be the case that one or more capacitive sensors 111 within the touch-sensitive input device 101 become degraded over time. Specifically, it may be the case that certain capacitive sensors 111 provide signals erroneously indicating a user touch when, in fact, no such contact has occurred. In such a case, one or more degraded capacitive sensors 111 may generate an erroneous signal associated with the touch-sensitive input device 101 and provide that signal to the processing device 107 where it may be detected by the processing device 107. The processing device 107 may translate such erroneous signals 117 into movement of the pointer 121 along a path 122 across the graphical user interface 120 to a boundary 123 of the graphical user interface 120. The processing device 107 may make a determination that the pointer 121 has reached the boundary 123 of the graphical user interface 120 (e.g. the position of the pointer 121 has reached a threshold position as defined by the GUI application).

Figure 8:
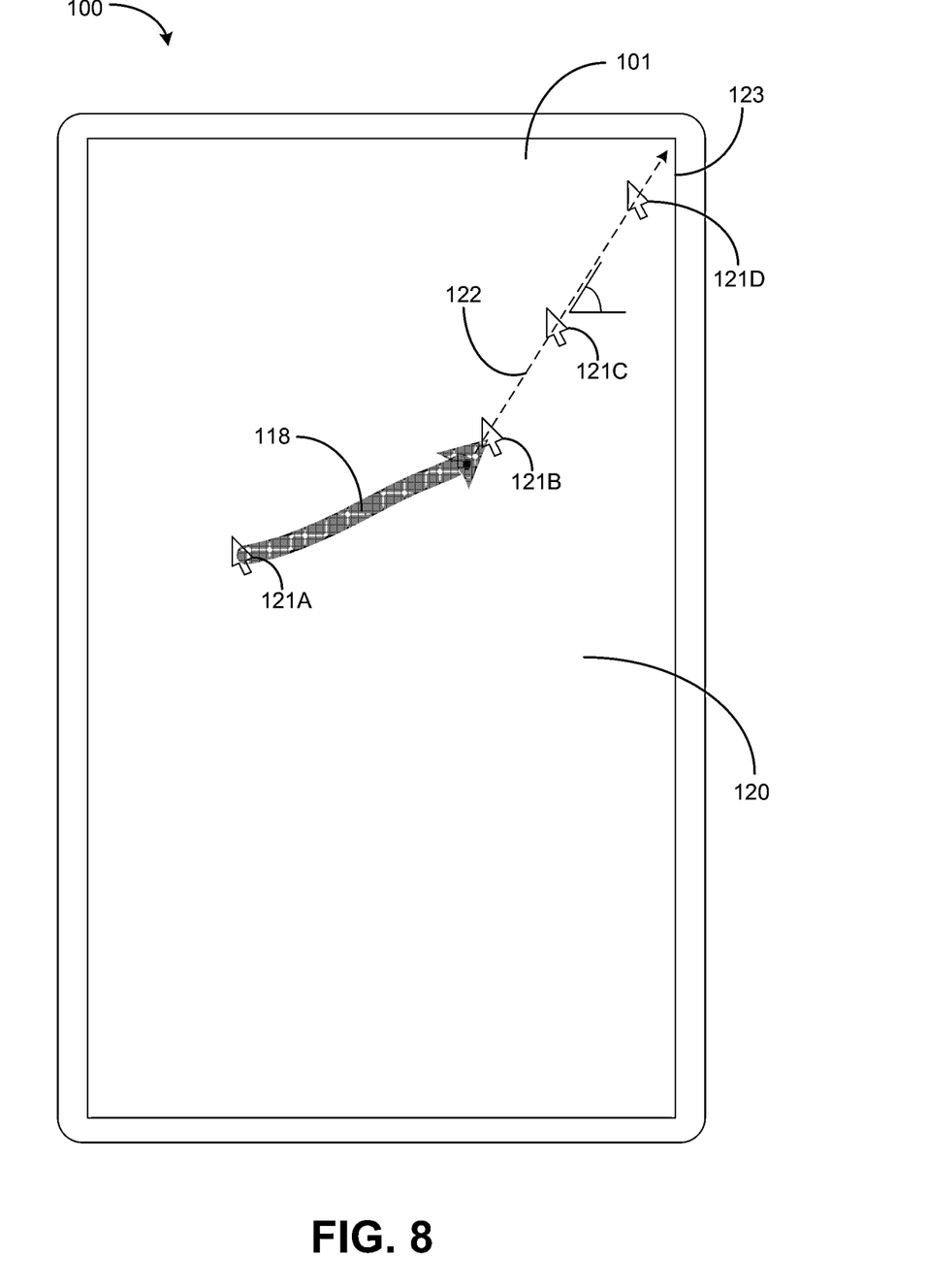
FIG. 8 illustrates a touch-based user input device.

Operation 720 illustrates detecting a signal indicative of a continued movement of the pointer in a direction substantially parallel to the path after the pointer has reached the boundary of the graphical user interface detecting a signal indicative of a continued movement of the pointer in a direction substantially parallel to the path after the pointer has reached the boundary of the graphical user interface. Upon a determination that the pointer 121 has reached the boundary 123 of the graphical user interface 120, it may be the case that degraded capacitive sensors 111 of the touch-sensitive input device 101 may continue to provide erroneous signals 117 indicating a continued movement of the pointer 121 in a direction substantially parallel to the path 122 that the pointer 121 traversed to reach the boundary 123 even after the pointer 121 has reached the boundary 123. To make this determination, the processing device 107 may compute the slope of the path 122 traversed by the pointer 121 to reach the boundary 123 at various points along the path 122 and determine if those slopes are substantially parallel and linear in nature. Then, the processing device 107 may compare the signals 117 indicating a continued movement of the pointer 121 and determine whether such movement is along the path 122, thereby indicating that the signals 117 are erroneous and that the touch-sensitive input device 101 may be degraded.

Operation 730 illustrates providing a user notification indicative of a degradation of the touch-based user input device in response to detecting a signal indicative of a continued movement of the pointer in a direction substantially parallel to the path after the pointer has reached the coundary of the graphical user interface. Following the determination of a degradation of the touch-sensitive input device 101 (e.g. as in operations 710 and 720), the processing device 107 may provide a notification (e.g. a user notification) indicating such a degradation. For example, the processing device 107 may provide one or more signals to the display device 102 of the computing device 100 causing the display device 102 to display a visual notification (e.g. a pop-up window including a text-based or graphical message, illumination of an LED) indicating that a degradation of the touch-sensitive input device 101 has been detected. In another example, the processing device 107 may provide one or more signals to the computing device 100 causing the computing device 100 to emit an audible notification (e.g. a spoken message) indicating that a degradation of the touch-sensitive input device 101 has been detected. In still another example, the processing device 107 may provide one or more signals to the transceiver 103 of the computing device 100 causing the transceiver 103 to transmit an electronic message (e.g. an e-mail, text message, instant message, and the like) to a network (e.g. cellular, satellite, LAN, WLAN and the like) operably coupled to the touch-sensitive input device 101 indicating that a degradation of the touch-sensitive input device 101 has been detected.

Figure 9:
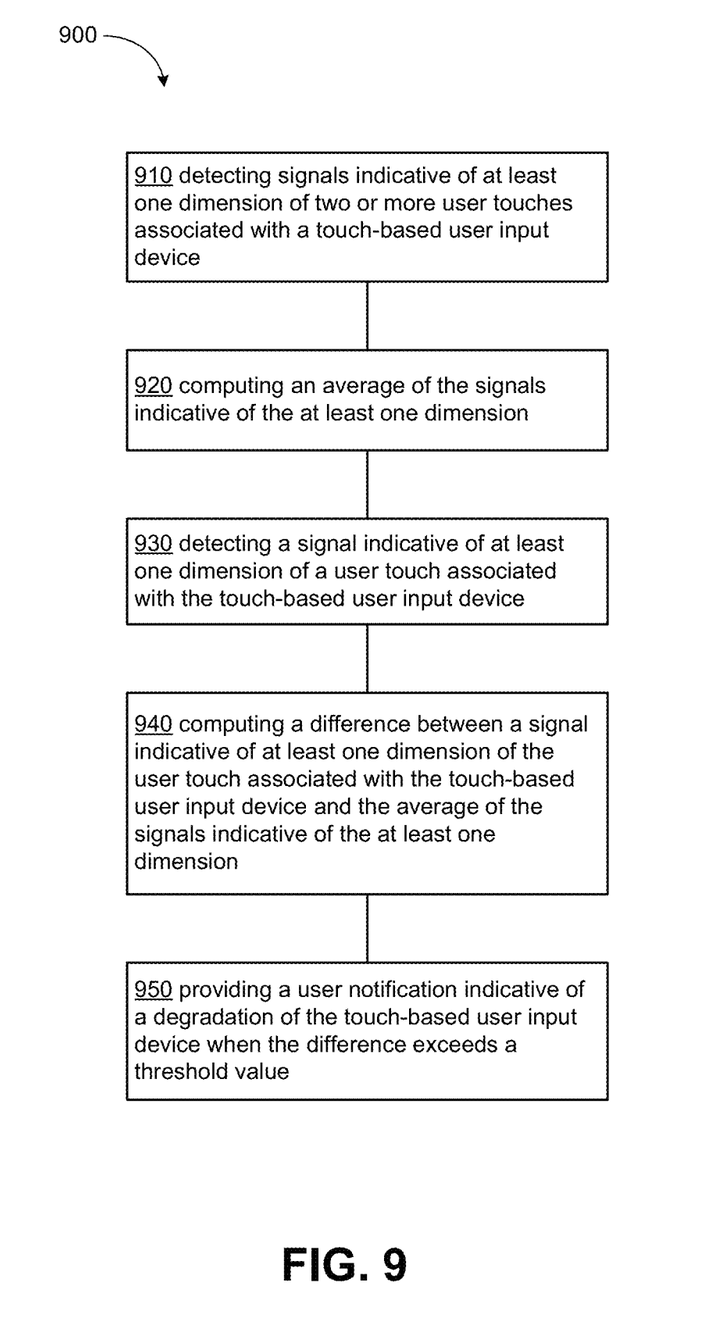
FIG. 9 illustrates a method for detecting degradation of a touch-based user input device.

FIG. 9 illustrates an operational flow 900 representing example operations related to detecting degradation of the touch-sensitive input device 101. Specifically, operational flow 900 presents operations which may be employed to detect a "loss of sensitivity"-type error condition where the touch-sensitive input device 101 generates signals indicating that a user touch has been received that is of greater dimension than the actual dimension of that user touch. In reference to FIG. 9, discussion and explanation may be provided with respect to the above-described examples of FIGS. 1-3 and 10A-10B, and/or with respect to other examples and contexts. However, it should be understood that the operational flows may be executed in a number of other environments and contexts, and/or in modified versions of FIGS. 1-3 and 10A-10B. In addition, although the various operational flows are presented in the sequence(s) illustrated, it should be understood that the various operations may be performed in other orders than those that are illustrated, or may be performed concurrently.

Figure 10A:
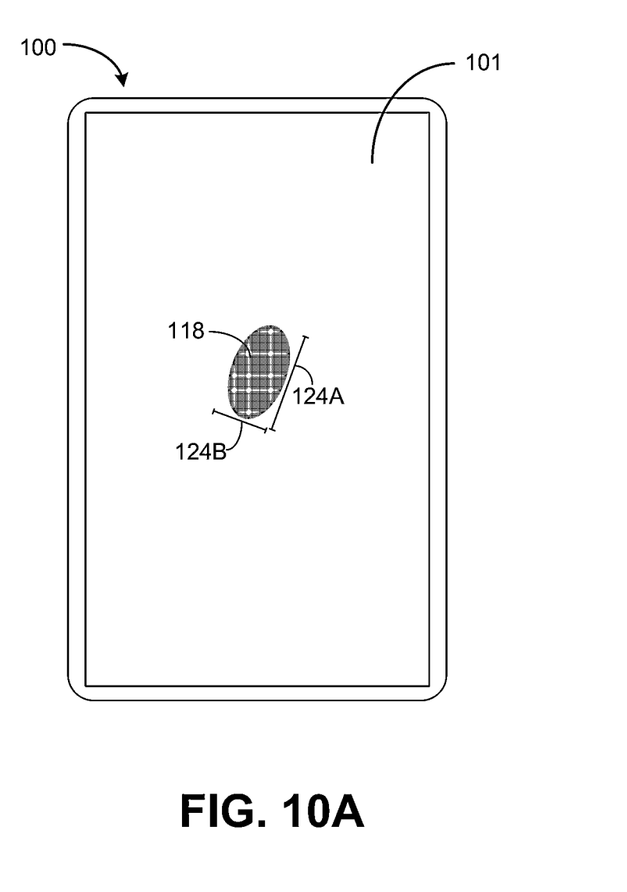
FIG. 10A illustrates a touch-based user input device.

Operation 910 illustrates detecting signals indicative of at least one dimension of two or more user touches associated with a touch-based user input device. For example, as shown in FIG. 10A, the touch-sensitive input device 101 (e.g. a touch screen) of the computing device 100 may receive a touch-based user input 118. As described above, the touch-sensitive input device 101 may generate a signals 117 indicative of a touch-based user input 118 and provide such signals to the processing device 107 where they may be detected by the processing device 107. Based on a perimeter defined by capacitive sensors 111 that provide signals 117 indicative a touch-based user input 118, the processing device 107 may compute dimensions 124 of the touch-based user input 118 (e.g. a length dimension 124A and/or a width dimension 124B).

Operation 920 illustrates computing an average of the signals indicative of the at least one dimension. For example, the processing device 107 may monitor signals indicative of multiple touch-based user inputs 118 and their computed dimensions 124 over a period of time and calculate an average for that dimension 124.

Figure 10B:
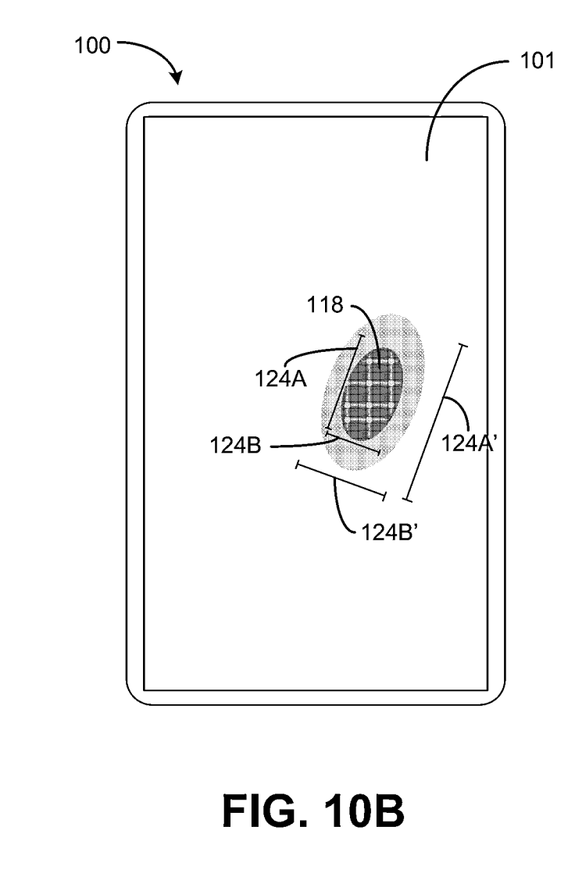
FIG. 10B illustrates a touch-based user input device.

Operation 930 illustrates detecting a signal indicative of at least one dimension of a user touch associated with the touch-based user input device. For example, as shown in FIG. 10B, it may be the case that one or more capacitive sensors 111 within the touch-sensitive input device 101 become degraded over time. Specifically, it may be the case that certain capacitive sensors 111 provide signals erroneously indicating a user touch when, in fact, no such contact has occurred. In such a case, one or more degraded capacitive sensors 111 may generate an erroneous signal indicating that a user touch has been received that is of greater dimension than the actual dimension of that user touch. As shown in FIG. 10B, a touch-based user input 118 having a dimension 124A and a dimension 124B may be received by the touch-sensitive input device 101. However, one or more degraded capacitive sensors 111 may cause the touch-sensitive input device 101 to provide signals 117 indicative of a user touch having a dimension 124A' and/or a dimension 124B' to the processing device 107 where the signals 117 may be detected by the processing device 107.

Operation 940 illustrates computing a difference between a signal indicative of at least one dimension of the user touch associated with the touch-based user input device and the average of the signals indicative of the at least one dimension. Upon detection of the signals 117 indicative of a user touch having a dimension 124A' and/or a dimension 124B', the processing device 107 may carry out one or more computations to determine whether or not the signals 117 correspond to a historical average for that dimension (e.g. as computed in operation 920). Specifically, the processing device 107 may compute a difference between the dimension 124A' and/or a dimension 124B' indicated by the signals 117 and the historical average for those dimensions. Should the difference between the dimension 124A' and/or a dimension 124B' indicated by the signals 117 and the historical average for those dimensions exceed a threshold amount, it may be determined that signals 117 indicative of a user touch having a dimension 124A' and/or a dimension 124B' are erroneous and that the touch-sensitive input device 101 may be degraded.

Operation 940 illustrates providing a user notification indicative of a degradation of the touch-based user input device when the difference exceeds a threshold value. Following the determination of a degradation of the touch-sensitive input device 101 (e.g. as in operations 910 and 940), the processing device 107 may provide a notification (e.g. a user notification) indicating such a degradation. For example, the processing device 107 may provide one or more signals to the display device 102 of the computing device 100 causing the display device 102 to display a visual notification (e.g. a pop-up window including a text-based or graphical message, illumination of an LED) indicating that a degradation of the touch-sensitive input device 101 has been detected. In another example, the processing device 107 may provide one or more signals to the computing device 100 causing the computing device 100 to emit an audible notification (e.g. a spoken message) indicating that a degradation of the touch-sensitive input device 101 has been detected. In still another example, the processing device 107 may provide one or more signals to the transceiver 103 of the computing device 100 causing the transceiver 103 to transmit an electronic message (e.g. an e-mail, text message, instant message, and the like) to a network (e.g. cellular, satellite, LAN, WLAN and the like) operably coupled to the touch-sensitive input device 101 indicating that a degradation of the touch-sensitive input device 101 has been detected.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a solid state storage device (e.g. a USB drive), etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for detecting degradation of a user input device, comprising:
   determining that a portion of the user input device is degraded based on two or more received signals of the user input device, the two or more received signals being indicative of one or more user inputs; and providing a user notification indicative of a degradation of the user input device in response to determining that a portion of the user input device is degraded based on two or more received signals of the user input device.

2. The method of claim 1, wherein determining that a portion of the user input device is degraded based on two or more received signals of the user input device comprises:
   detecting at least one first signal indicative of at least one user input associated with a first region of the user input device;
   detecting, within a threshold time period, at least one second signal associated with a second region of the user input device;
   determining that a distance between the first region and the second region is greater than a threshold distance; and
   determining that the portion of the user input device is degraded based on the distance between the first region and the second region being greater than the threshold distance.

3. The method of claim 1, wherein determining that a portion of the user input device is degraded based on two or more received signals of the user input device comprises:
   detecting at least one first signal indicative of at least one user input associated with a region of the user input device;
   detecting, within a threshold time period, two or more signals indicative of two or more repeated user inputs at least partially associated with the region of the user input device; and
   determining that the portion of the user input device is degraded based on detecting, within a threshold time period, two or more signals indicative of two or more repeated user inputs at least partially associated with the region of the user input device.

4. The method of claim 1, wherein determining that a portion of the user input device is degraded based on two or more received signals of the user input device comprises:
   detecting at least one signal indicative of at least one user input associated with a region of the user input device;
   detecting two or more repeated signals at least partially associated with the region of the user input device;
   determining that a number of the two or more repeated signals is greater than a threshold value; and
   determining that the portion of the user input device is degraded based on determining that a number of the two or more repeated signals is greater than a threshold value.

5. The method of claim 1, wherein determining that a portion of the user input device is degraded based on two or more received signals of the user input device comprises:
   determining, at least twice, that the portion of the user input device is degraded based on two or more received signals of the user input device, the two or more received signals being indicative of one or more user inputs,
   wherein providing a user notification indicative of a degradation of the user input device in response to determining that a portion of the user input device is degraded based on two or more received signals of the user input device comprises:
   upon determining, at least a threshold number of times, that the portion of the user input device is degraded, providing a user notification indicative of a degradation of the user input device in response to determining that a portion of the user input device is degraded based on two or more received signals of the user input device.

6. The method of claim 1, wherein providing a user notification indicative of a degradation of the user input device in response to determining that a portion of the user input device is degraded based on two or more received signals of the user input device comprises:
   providing a visual notification.

7. The method of claim 1, wherein providing a user notification indicative of a degradation of the user input device in response to determining that a portion of the user input device is degraded based on two or more received signals of the user input device comprises:
   providing an audible notification.

8. The method of claim 1, wherein providing a user notification indicative of a degradation of the user input device in response to determining that a portion of the user input device is degraded based on two or more received signals of the user input device comprises:
   providing a user notification to a display device.

9. The method of claim 1, wherein the user input device comprises one of a mouse, a microphone, a selection button, or a key board.

10. The method of claim 1, wherein providing a user notification indicative of a degradation of the user input device in response to determining that a portion of the user input device is degraded based on two or more received signals of the user input device comprises:
    providing a user notification over a network.

11. The method of claim 1, wherein determining that a portion of the user input device is degraded based on two or more received signals of the user input device comprises:
    comparing the two or more received signals of the user input device; and
    determining that the portion of the user input device is degraded based on a comparison of the two or more received signals of the user input device.

12. A system for detecting degradation of a user input device, comprising:
    means for determining that a portion of the user input device is degraded based on two or more received signals of the user input device, the two or more received signals being indicative of one or more user inputs; and
    means for providing a user notification indicative of a degradation of the user input device in response to determining that a portion of the user input device is degraded based on two or more received signals of the user input device.

13. The system of claim 12, wherein the means for determining that a portion of the user input device is degraded based on two or more received signals of the user input device comprises:
    means for detecting at least one first signal indicative of at least one user input associated with a first region of the user input device;
    means for detecting, within a threshold time period, at least one second signal associated with a second region of the user input device;
    means for determining that a distance between the first region and the second region is greater than a threshold distance; and
    means for determining that the portion of the user input device is degraded based on the distance between the first region and the second region being greater than the threshold distance.

14. The system of claim 12, wherein the means for determining that a portion of the user input device is degraded based on two or more received signals of the user input device comprises:
    means for detecting at least one first signal indicative of at least one user input associated with a region of the user input device;
    means for detecting, within a threshold time period, two or more signals indicative of two or more repeated user inputs at least partially associated with the region of the user input device; and
    means for determining that the portion of the user input device is degraded based on detecting, within a threshold time period, two or more signals indicative of two or more repeated user inputs at least partially associated with the region of the user input device.

15. The system of claim 12, wherein the means for determining that a portion of the user input device is degraded based on two or more received signals of the user input device comprises:
   means for detecting at least one signal indicative of at least one user input associated with a region of the user input device;
   means for detecting two or more repeated signals at least partially associated with the region of the user input device;
   means for determining that a number of the two or more repeated signals is greater than a threshold value; and
   means for determining that the portion of the user input device is degraded based on determining that a number of the two or more repeated signals is greater than a threshold value.

16. The system of claim 12, wherein the means for determining that a portion of the user input device is degraded based on two or more received signals of the user input device, the two or more received signals being indicative of one or more user inputs, comprises:
   means for determining, at least twice, that the portion of the user input device is degraded based on two or more received signals of the user input device, the two or more received signals being indicative of one or more user inputs,
wherein the means for providing a user notification indicative of a degradation of the user input device in response to determining that a portion of the user input device is degraded based on two or more received signals of the user input device comprises:
   means for upon determining, at least a threshold number of times, that the portion of the user input device is degraded, providing a user notification indicative of a degradation of the user input device in response to determining that a portion of the user input device is degraded based on two or more received signals of the user input device.

17. The system of claim 12, wherein the means for providing a user notification indicative of a degradation of the user input device in response to determining that a portion of the user input device is degraded based on two or more received signals of the user input device comprises:
   means for providing at least one of a visual notification, an audible notification, and an electronic messaging notification.

18. A method for detecting degradation of a user input device, comprising:
   detecting signals of the user input device, each of the signals being associated with a particular user input of a plurality of user inputs, wherein signals are indicative of at least one dimension of the particular user input;
   computing at least one dimension for each user input of the plurality of user inputs upon detecting signals of the user input device;
   computing at least one average user input dimension upon computing at least one dimension for each user input of the plurality of user inputs;
   detecting one or more subsequent signals of the user input device, the one or more subsequent signals being associated with a subsequent user input, wherein the one or more subsequent signals are indicative of at least one subsequent dimension of the subsequent user input;
   computing at least one dimension of the subsequent user input upon detecting one or more subsequent signals of the user input device;
   computing a difference between a) a particular subsequent dimension of the at least one subsequent dimension associated with the subsequent user input and b) a particular average dimension of the at least one average user input dimension associated with the plurality of user inputs;
   determining that said computed difference exceeds a threshold value;
   determining that a portion of the user input device is degraded based on said computed difference exceeding the threshold value; and
   providing a user notification indicative of a degradation of the user input device in response to determining that a portion of the user input device is degraded.

19. The method of claim 18, wherein determining that a portion of the user input device is degraded based on said computed difference exceeding the threshold value comprises:
   determining, at least twice, that a portion of the user input device is degraded based on said computed difference exceeding the threshold value,
wherein providing a user notification indicative of a degradation of the user input device in response to determining that a portion of the user input device is degraded comprises:
   upon determining, at least a threshold number of times, that a portion of the user input device is degraded based on said computed difference exceeding the threshold value, providing a user notification indicative of a degradation of the user input device in response to determining that a portion of the user input device is degraded.

20. The method of claim 18, wherein providing a user notification indicative of a degradation of the user input device in response to determining that a portion of the user input device is degraded comprises:
   providing at least one of a visual notification, an audible notification, and an electronic messaging notification.

* * * * *